United States Patent Office 2,908,682
Patented Oct. 13, 1959

2,908,682

4,5-EPOXYSTEROIDS AND THEIR MANUFACTURE

Roy H. Bible, Jr., Morton Grove, and Chester Placek, Chicago, Ill., assignors to G. D. Searle & Co., Chicago, Ill., a corporation of Delaware No Drawing. Application June 25, 1956
Serial No. 593,325

6 Claims. (Cl. 260—239.55)

The present invention relates to a new group of 4,5-epoxy-3-ketosteroids and, more particularly, to the compounds of the general structural formula

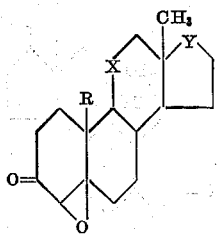

wherein R is a member of the class consisting of hydrogen and methyl radicals, X is a member of the class consisting of methylene, carbinol, and carbonyl radicals, and Y is a member of the class consisting of carbonyl, carbinol, >CH—CO—CH$_3$ and >CH—CO—CH$_2$OH radicals.

As indicated by the foregoing structural formula these steroids can be substituted in the 17-position by an oxo, hydroxy, acetyl or glycolyl radical.

The foregoing structural formula also shows that these steroids can be substituted in the 11-position by an oxo, an α-hydroxy or a β-hydroxy group. The 11-hydroxy compounds can also be esterified with a hydrocarbon carboxylic acid containing preferably less than 10 carbon atoms.

The compounds of our invention are conveniently prepared by the treatment of a Δ$^4$-3-ketosteroid of the structural formula

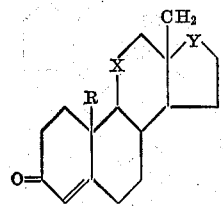

in which R, X and Y are defined as hereinabove, with hydrogen peroxide in the presence of alkali, e.g. an alkali metal hydroxide or an alkaline earth metal hydroxide. Among the preferred solvents for carrying out this reaction are the lower alkanols. It is not necessary to supply external heat and we prefer to add the hydrogen peroxide and the alkali simultaneously at such a rate that the temperature does not rise much above room temperature.

The compounds of our invention are valuable medicinal agents because of their gonadal, progestational, adrenocorticoid, lympholytic, diuretic and anabolic hormonal properties. The compounds are also valuable in correcting dysfunction of electrolyte metabolism and are local anesthetics. A special field of utility of these compounds consists in their use as intermediates in the synthesis of other hormonally active compounds. Thus we have found that treatment of these 4,5-epoxy steroids with a strong organic acid such as formic acid yields the corresponding 4-hydroxy-Δ$^4$-3-ketosteroids of the structural formula

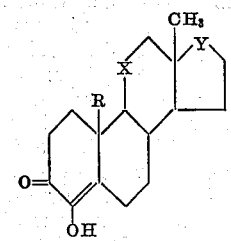

wherein R, X and Y are defined as hereinabove. Some of the 4-hydroxy steroids have been found to possess valuable hormonal properties. Thus, 4-hydroxyprogesterone is an effective progesterone inhibitor and 4-hydroxy-testosterone is effective in treatment of androgen deficiency.

The following examples illustrate in further detail the compounds which constitute this invention and the methods for their synthesis. However, the invention is not to be construed as limited in spirit or in scope by the details set forth therein. It will be apparent to those skilled in the art that numerous modifications in materials and methods can be practiced without departing from the invention in spirit or in scope. In these examples quantities are indicated as parts by weight.

The present application is a continuation in part of our copending application Serial No. 424,521, filed April 20, 1954, now abandoned.

Example 1

To a stirred solution of 4.12 parts of 19-nor-testosterone in 135 parts of methanol, 23 parts of 4-N aqueous sodium hydroxide solution and 22 parts of 30% hydrogen peroxide are added dropwise and simultaneously at 20° C. The reaction mixture is maintained for 12 hours at 2° C. after which it is filtered and the filtrate is diluted with water until cloudiness occurs. The aqueous methanolic solution is then extracted with benzene. The extract is washed with water, dried over anhydrous sodium sulfate and evaporated under vacuum. The 4,5-epoxy-17β-hydroxy-19-nor-3-androstanone thus obtained, crystallized from petroleum ether, melts at 49–54° C. The infrared absorption spectrum shows maxima at 2.83, 5.91, 6.90, 7.13, 7.27, 7.49, and 11.63 microns. No pronounced maxima are observed in the ultraviolet spectrum between 220 to 300 millimicrons. It has the structural formula

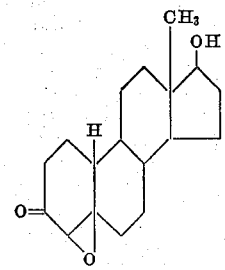

Example 2

A turbinated solution of 25 parts of testosterone in 800 parts of methanol is treated by gradual and simultaneous addition with 139 parts of 4-N sodium hydroxide solution and 133 parts of 30% hydrogen peroxide. After storage at 0° C. for 12 hours the reaction mixture is filtered and the filtrate is diluted with water to the point of cloudiness. It is then exhaustively extracted with benzene and the benzene extract is washed with water, dried over anhydrous calcium sulfate, filtered and freed from solvent by vacuum distillation. The residue is recrystallized from petroleum ether. The 4,5-epoxy-17β-hydroxy-3-androstanone melts at about 150–157° C. The optical rotation of a 1% chloroform solution [α_D^25] is +140°. Infrared maxima are observed at 2.83, 5.92, 6.92, 7.13, 7.25, 7.50 and 11.64 microns.

Example 3

A solution of 23 parts of adrenosterone in 4000 parts of methanol is stirred and treated by simultaneous, gradual addition of 138 parts of 4-N sodium hydroxide solution and 132 parts of 30% hydrogen peroxide at 20° C. The reaction mixture is then stored at 0° C. for 15 hours, filtered and diluted with water until it becomes cloudy. It is then extracted with benzene and the benzene extract is washed with water, dried over anhydrous sodium sulfate and freed from solvent by vacuum distillation. Recrystallized from petroleum ether, 4,5-epoxy-3,11,17-androstanetrione melts at 250–258° C. Infrared maxima are observed at 5.76, 5.85, 6.90, 6.99, 9.50, and 12.65 microns. The compound has the structural formula

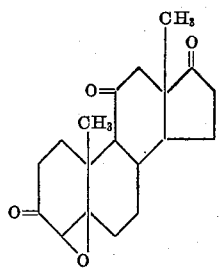

A second isomer, melting at about 198–208° C., is obtained by concentration of the petroleum ether mother liquor and recrystallization from acetone.

Example 4

An agitated solution of 5 parts of progesterone in 160 parts of methanol is treated by simultaneous, gradual addition with 28 parts of 4-N sodium hydroxide solution and 27 parts of 30% hydrogen peroxide at 25° C. The reaction mixture is kept at 2° C. for 15 hours and filtered. The filtrate is diluted with water until cloudiness occurs and then extracted with benzene. The extract is washed with water, dried over anhydrous calcium sulfate, filtered and evaporated to yield 4,5-epoxy-3,20-pregnanedione which, recrystallized from petroleum ether, melts at about 114–117° C. The optical rotation of a 1% chloroform solution [α_D^25] is +160°. Infrared maxima are observed at 5.88, 6.95, 7.13, 7.22, 7.31, 7.39, and 11.61 microns.

Example 5

To a stirred solution of 50 parts of desoxycorticosterone in 1600 parts of methanol, 276 parts of 4-N aqueous sodium hydroxide solution and 264 parts of 30% hydrogen peroxide are added simultaneously in small portions at 20° C. The reaction mixture is stored at 3° C. for 15 hours and the precipitate is collected. The filtrate is diluted with water until it becomes cloudy and is then extracted with benzene. The benzene extract is washed with water, dried over anhydrous sodium sulfate, filtered and evaporated to yield 4,5-epoxy-21-hydroxy-3,20-pregnanedione which, recrystallized from petroleum ether, melts at about 125–130° C. The optical rotation of a 1% chloroform solution [α_D^25] is +190°. The infrared absorption spectrum has sharp bands at 2.89, 6.92, 7.10, 7.22, 7.40, 9.35, and 11.55 microns and a broad band at 5.85 microns.

Example 6

A solution of 95 parts of 11α-hydroxyprogesterone in 2900 parts of methanol is stirred and treated by simultaneous, gradual addition of 530 parts of 4-N aqueous sodium hydroxide and 506 parts of hydrogen peroxide at 25° C. The reaction mixture is maintained at 0° C. for 15 hours and then filtered. The filtrate is diluted with water until cloudiness occurs and then extracted with benzene. The extract is washed with water, dried over anhydrous sodium sulfate, filtered and evaporated. Crystallized from petroleum ether, the 4.5-epoxy-11α-hydroxy-3,20-pregnanedione melts at about 118–123° C. The optical rotation of a 1.1% chloroform solution [α_D^25] is +152°.

A second isomer, melting at about 156–158° C., can be obtained by chromatography of the material in the mother liquor over silica and development with benzene solutions containing increasing concentrations of ethyl acetate. The isomer is eluted with a solution of 40% ethyl acetate in benzene and then recrystallized from aqueous methanol.

The 11β-hydroxy isomer is obtained from 11β-hydroxyprogesterone by the same method. The infrared absorption spectrum of the product shows maxima at 2.85, 5.89, 6.96, 7.12, 7.21, 7.32, 7.40, and 11.60 microns. The compound has the structural formula

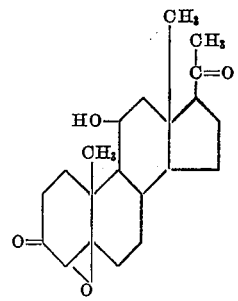

Example 7

To a stirred solution of 10 parts of corticosterone in 1500 parts of methanol, 48 parts of 4-N sodium hydroxide and 48 parts of 30% hydrogen peroxide are added dropwise and simultaneously at 18° C. The reaction mixture is maintained for 15 hours at 5° C. and then filtered. The filtrate is diluted with water until it becomes cloudy and then extracted with toluene. The extract is washed with water, dried over anhydrous calcium sulfate, filtered and evaporated to yield 4,5-epoxy-11β,21-dihydroxy-3,20-pregnanedione. Recrystallized from petroleum ether it melts at 146–150° C. with decomposition. The compound has the structural formula

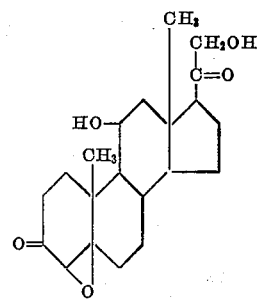

Example 8

A mixture of 40 parts of 4,5-epoxy-3,20-pregnanedione, 206 parts of 98% formic acid and 38 parts of water is refluxed for 30 minutes after which the solvent is removed by vacuum distillation and the residue is taken up in 400 parts of methanol. A solution of 40 parts of sodium carbonate in 100 parts of water is added and the resulting slurry is allowed to stand overnight. The mixture is then diluted with water and the resulting precipitate is collected on a filter. Recrystallization from aqueous methanol yields clusters of needles. Further purification can be accomplished by vacuum sublimation. The 4-hydroxyprogesterone thus obtained melts at about 226–228° C. after some previous softening. The ultraviolet spectrum shows a maximum at 276 millimicrons with a molecular extinction coefficient of 11,400. The specific rotation of a 1% chloroform solution [α_D^25]

is +177°. Infrared maxima are observed at 2.92, 5.91, 6.02, 6.16, 6.95, 7.27, 7.45, and 11.60 microns.

Chromatographic separation of the material obtained by evaporation of the mother liquors yields two further compounds. One of these, the first to be eluted from a silica column with a mixture of benzene and increasing proportions of ethyl acetate, melts at 139–142° C. and has a strong band at 5.78 microns in the infrared spectrum. The other compound, the second to be eluted from the silica column, melts at 143–148° C. and has a strong maximum at 245 millimicrons in the ultraviolet spectrum.

Instead of refluxing the initial reaction mixture for 30 minutes one can also let the reaction stand at room temperature for a day; also it is not necessary in this step to use water. Instead of using formic acid one may also employ 10% aqueous hydrochloric acid; however, with hydrochloric acid one also obtains as a by-product a considerable amount of a compound having a strong absorption in the ultraviolet spectrum at 245 millimicrons.

*Example 9*

To a stirred solution of 4.5 parts of 4-androstane-3,17-dione in 160 parts of methanol are added dropwise and simultaneously 28 parts of 4-N sodium hydroxide and 27 parts of 30% hydrogen peroxide. The mixture is maintained at about 20° C. during the addition and then stored for 15 hours at 2° C. After dilution with water the mixture is extracted with benzene. The benzene extract is washed with water and then dried over anhydrous sodium sulfate, filtered and evaporated. The residue is recrystallized several times from a mixture of petroleum ether and acetone to yield 4,5-epoxy-3,17-androstanedione as colorless crystals melting at about 198–204° C. A second isomer, melting at about 159–163° C., is obtained by recrystallization of the material contained in the mother liquors from acetone and petroleum ether.

*Example 10*

A liquid culture medium containing a commercial enzymatic digest of whey protein, corn steep liquor and dextrose is adjusted to pH 4.5 with concentrated hydrochloric acid and dispensed in 400 part quantities in flasks plugged with non-absorbent cotton and sterilized in an autoclave for 5 minutes at 120° C. After cooling to room temperature, each of 20 such flasks is inoculated with 3 parts of a suspension of spores of *Rhizopus nigricans* (ATCC 6227b) prepared from a 12 day culture of the organism on a hominy grit sporulation medium. These cultures are incubated at 25° C. on a rotary shaker for 24 hours, at which time each receives 0.1 part of 4,5-epoxy-3,20-pregnanedione in 4 parts of ethanol. Incubation is continued for an additional 24 hour period. The cultures are then pooled and mycelium is separated by filtration and washed with dichloromethane.

The filtrate is extracted with dichloromethane and the dichloromethane solutions are pooled and concentrated under vacuum to about 750 parts. The concentrate is washed with dilute aqueous sodium bicarbonate solution and then with water and finally taken to dryness under vacuum. The residue is chromatographed over silica gel. The column is developed with benzene solutions containing increasing concentrations of ethyl acetate.

The material eluted with 25% ethyl acetate is recrystallized from methanol to yield 4,5-epoxy-11α-hydroxy-3,20-pregnanedione melting at about 156–159° C.

What is claimed is:

1. An epoxide of the general structural formula

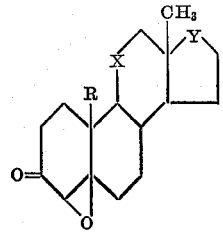

wherein R is a member of the class consisting of hydrogen and methyl radicals, X is a member of the class consisting of methylene, carbinol and carbonyl radicals and Y is a member of the class consisting of carbonyl, carbinol, >CH—COCH$_3$ and >CH—COCH$_2$OH radicals.

2. 4,5-epoxy-3,11,17-androstanetrione.
3. 4,5-epoxy-17β-hydroxy-3-androstanone.
4. 4,5-epoxy-11-hydroxy-3,20-pregnanedione.
5. 4,5-epoxy-21-hydroxy-3,20-pregnanedione.
6. 4,5-epoxy-3,20-pregnanedione.

References Cited in the file of this patent
UNITED STATES PATENTS
2,312,344    Logemann _____ Mar. 2, 1943